United States Patent [19]
Di Settembrini

[11] 3,882,074
[45] May 6, 1975

[54] PROCESS FOR THE PREPARATION OF POLYVINYL CHLORIDE MOULDING COMPOSITIONS

[76] Inventor: Antoine Di Settembrini, 4 Avenue Alfred de Vingy, Soisy-sous-Montmorency, France

[22] Filed: July 19, 1972

[21] Appl. No.: 273,124

[30] Foreign Application Priority Data
July 22, 1971 France .............................. 71.26905

[52] U.S. Cl. .......... 260/34.2; 260/92.8 A; 260/890; 260/891
[51] Int. Cl...... C08f 29/24; C08f 47/00; C08d 9/08
[58] Field of Search............. 260/92.8 A, 890, 34.2, 260/DIG. 21

[56] References Cited
UNITED STATES PATENTS
3,108,988 10/1963 Burri................................. 260/45.5
3,251,798 5/1966 Pollien............................... 260/34.2
3,635,928 1/1972 Thomas............................. 260/92.8
3,644,577 2/1972 Lee et al........................... 260/876 R Primary Examiner—Joseph L. Schofer
Assistant Examiner—John Kight, III
Attorney, Agent, or Firm—Robert E. Burns; Emmanuel J. Lobato; Bruce L. Adams

[57] ABSTRACT

A powdered composition capable of being worked on heating is prepared from a PVC, or PVC copolymer, base, an (impact resistant) antishock additive, stabilisers and lubricants, by first mixing the additives at a temperature of 40° to 120°C. The mixture is allowed to cool and then dispersed in the PVC base by mixing in the cold. The mixture becomes homogeneous during the heating prior to working.

6 Claims, No Drawings

PROCESS FOR THE PREPARATION OF POLYVINYL CHLORIDE MOULDING COMPOSITIONS

BACKGROUND OF THE INVENTION

The invention relates to a process for the preparation of a composition based on polyvinyl chloride and capable of being worked in order to be moulded.

A number of processes are at present used for the preparation of compositions based on PVC which are to be worked up into finished products. Numerous articles can be manufactured from these compositions, examples being solid sections or hollow bodies such as packings and more particularly bottles intended for liquid foodstuffs and so forth, such as water, oil, wine or vinegar. These articles can be produced, in particular, by injecting or extruding the composition by the blow process, or by any other method.

Compositions with a PVC base capable of being worked in this manner generally comprise a pure PVC, or PVC copolymer, and (impact resistance) anti-shock additives, lubricants and stabilizers, in proportions which vary according to the application required. Other additives for certain functions, such as pigments, plasticizers or charges, may likewise be added to the composition.

In known processes for preparing these compositions the first basic stage consists of mixing the polymer with all the desired additives for specific functions. In one method the mixture is heated, a sheet is formed from the gelled product and the sheet is then granulated. This granulate, which can be used direct, is the material supplied to the manufacturer of finished articles.

In another method, designed to avoid excessive heating of the PVC, the mixture is produced in powder form, at a temperature of about 100°. These conditions can be provided in a simple manner either in a mixer having two vats, one being heated, or in a high-speed mixer in which the temperature is attained merely by the friction of the particles. In both cases, all the constituents, i.e., the PVC and the various additives, are introduced into the mixer, and the heat opens up the grains of the polymer, which take up the liquid and solid additives. During the subsequent cooling the grains reclose, and after a certain waiting period the user has a composition ready for use.

Compositions of this kind generally comprise about 80% PVC and 20% additives. Owing to the large amount of material involved the work is often divided between the manufacturer of the composition and the user who intends to produce finished articles therefrom. In all known processes, particularly those which have just been described, the user is supplied by the manufacturer with a composition in the form of powder or easily "pourable" granulate. In the course of the manufacture of the finished articles this powder has to be heated once again, so that it can be gelled and then worked up, for example, in a blow extrusion machine.

It is thus to be noted that the PVC has to be heated at least twice before a finished article is produced, once by the manufacturer of the composition and a second time by the user. It is well known to technicians in this field that the heating of PVC inevitably promotes degradation. The latter accelerates in each heating process, even if stabilizing additives have been introduced into the composition. These additives, which are consumed by the PVC at every appreciable temperature increase, do not enable the degradation phenomenon to be eliminated altogether.

Up to the present time the compositions have been prepared on these lines, despite the degradation of the polymer, as it appeared absolutely indispensable, if about 80% PVC was to be enabled to absorb the 20% of additives, that the additives should be mixed with the mass of the polymer, in order to obtain a completely homogeneous composition in which the grains of PVC would have correctly absorbed the various additives.

In addition to the drawback of the dual heating already described and the consequence thereof, i.e., the increased consumption of stabilizers, the known processes suffer from further serious disadvantages. They require the use of mixing apparatus of very high capacity, thus consuming a great deal of power, since the first stage in the preparation of the composition is the incorporation of the large proportion of PVC, in which the additives are to be absorbed. This also involves excessive handling of the composition on its way from the manufacturer to the user.

It is a main object of the present invention to overcome these drawbacks by avoiding the heating and thus degradation of the polymer during the manufacture of the composition.

A further object of the invention is to reduce the consumption of stabilizers involved in stabilizing PVC and to produce better stabilized finished articles.

Another object of the invention is to obviate excessive handling of the PVC during the manufacture of the composition, so that mixers of far smaller capacity can be used and the consumption of power thus reduced.

A further object of the invention is to improve the manner in which additives performing specific functions are distributed in the PVC, mainly in order to reduce the gelatinization time of the composition and to obtain high-quality finished articles.

SUMMARY OF THE INVENTION

The process of the present invention is characterized by the fact that the anti-shock additive, the lubricants and the stabilizers are mixed at a temperature between 40° and 120°C, this mixture is left to cool, and the desired quantity of PVC or PVC copolymer is dispersed therein before the composition is worked up.

Contrary to certain known processes, it is not necessary, in the process of the invention, to take the base resin of the final mixture in order to prepare the master batch. One of the well known characteristics of PVC is that it is more or less impossible to recover the additives which have been absorbed by temperature increase and subsequent cooling. The grains of PVC thus created will not release these additives except at the gelatinization temperatures, the result of which would be to prevent the stabilizing additives or lubricants from performing their functions in the first phase of manufacture and thus to initiate irreversible degradation phenomena.

In the process covered by the invention, on the other hand, the liquid additives are the only ones absorbed and this takes place at a low temperature, the others being absorbed in the grains of one or more complementary resins other than the base resin. The complementary resin or resins, treated by the process to which the invention relates, disperse immediately when they come in contact with the base resin and give off the additives with which they have been charged.

It has been discovered that contrary to widespread preconceived notions it is possible to fix the lubricants and stabilizers on the anti-shock agent before the mixture of additives is incorporated in a cold state into the PVC. The composition, e.g., 80% PVC, becomes homogeneous in the course of the first heating phase during the manufacture of the finished article. This homogeneity is in fact greatly assisted by the fact that the composition is caused to gel more rapidly when its various constituents are mixed in the manner of the invention. If the compositions prepared by known processes were to be homogeneous before they are used, i.e., before their second heating, to improve their gelatinization time it was found that it was sufficient if the additives were homogeneous in respect of one another before being incorporated in a solid state into the PVC, in order to obtain finished products of excellent quality. To obtain a more stable and more easily workable composition, therefore, all that is required is to improve the homogeneity of the agents and avoid the degradation of the PVC.

DETAILED DESCRIPTION

A typical composition which can be used, for example, in the blow extrusion process is given hereunder. Needless to say, the products in themselves may vary in proportion to specific functions, according to the type of machine used and the article to be manufactured.

PVC, suspension, KWERT 56: 100% by weight.
Anti-shock: methyl-acrylonitrile-butadiene-styrene (MABS) or MBS or ABS: 12%.
Epoxidized oil (stabilizer): 3.6%.
Ca—Zn complex (stabilizer): 1.2%, as well as its chelating agent, such as trinonyl phenyl phosphite.
α-phenyl indole (stabilizer): 0.25%
Glycerol hydroxystearate (lubricant): 1%
Glycerol trimontanate (lubricant): 0.7%.

The preparation of the above composition by the process to which the invention relates is effected as follows:

A high-speed mixer (1,500 r.p.m.) in which the temperature increase is brought about solely by the friction of the grains of the composition, or a low-speed mixer in which this operation is carried out by heating, is fed with the correct quantity of powdered anti-shock additive, in a cold state. The epoxidized oil and the chelating agent are preferably introduced at 70°C when the anti-shock agent has reached a temperature of 50°C. The temperature is then allowed to rise to 80°C, preferably in a vacuum, in order to eliminate any water present in the anti-shock additive which is a hydrometric substance. The remainder of the stabilizers and lubricants can be introduced as soon as the cooled mixture has reached a temperature of 40°C.

If a perfectly anhydrous anti-shock additive is available, and even if a solid stabilizer with an Sn or Ba—Cd base is used in place of the epoxidized oil, the total mixture can be effected at a temperature of between 40° and 50°C.

The powder obtained is a homogeneous mixture of the additives and can be poured with ease, a by no means unimportant property when hoppers are used for a charging operation. The desired proportion of the mixture of the different additives can be incorporated in a dry and cold state into powdered PVC. This mixture, i.e., the effective formation of the over-all composition, can be effected by the user himself, if he has available quantities of the pure PVC and of the homogeneous mixture of the additives. The fact is that the user very often possesses a cold mixer together with his plant, such as a blow extrusion machine, so that crushed particles of the manufacturing residues can be reincorporated into the extrusion composition. The mixture becomes homogeneous in the first heating phase, e.g., at 140°C at the beginning of the extrusion screw of a blow extrusion machine. The yellow colouring of articles extruded from the composition prepared by the process of the invention is far less distinct than that obtained with the mixing processes already known. This demonstrates the more satisfactory stabilization of the PVC contained in the composition resulting from the process of the invention.

As regards the gelatinization time, comparative tests have been carried out with the composition defined above, and prepared by the process just described, and the same composition prepared by the conventional process, in which the agents are mixed with the heated PVC, as follows:

The PVC powder and the Ca-Zn complex are mixed, at 70° and the α-phenyl-indole, epoxidized oil and chelating agent are added. Subsequently, at 80°–110°, the glycerol hydroxystearate, glycerol trimontanate and powdered antishock additive are likewise added. The cooled mixture has the consistency of dry powder.

Test carried out with a plastograph (BRABENDER) with 25g of powder, at 30 r.p.m. and 150°, give the following results:

Composition prepared by process of the invention:

| | |
|---|---|
| Commencement of gelatinization: | 15". |
| Fusion time: | 75". |
| Gelatinization time: | 90". |

Composition prepared by known process (dry blend method)

| | |
|---|---|
| Commencement of gelatinization: | 90". |
| Fusion time: | 110" |
| Gelatinization time: | 200". |

As gelatinization of the composition prepared by the process of the invention proceeds with extreme rapidity it is thus possible for the homogenized agents and the pure PVC to be mixed very satisfactorily during the first heating phase, e.g., over a short traject of the extrusion screw, which is not possible in the case of the processes already known.

The finished articles are of excellent quality and well stabilized.

Stabilization tests have also been carried out on two powders of identical composition prepared by the two different processes which have just been described. In this test a film is produced from a powder brought to a temperature of 190°C, after which the film is cut up into a number of samples which are placed in an oven at a temperature of 185°C, from which one sample is extracted every ten minutes. A comparison between the samples of the two powders thus heated shows that the yellow and subsequently brown colouring is far less dark up to 55 minutes in the film made with the powder prepared by the process of the invention.

This process results in an article which proves entirely satisfactory, also obviating the heating and the degradation of the PVC, its excessive handling and the consumption of a large amount of stabilizing agent, in addition to improving the gelatinization of the composition.

The term anti-shock as used herein is synonymous with impact resistance.

Although the invention has been described by reference to certain particular examples and agents it also covers minor modifications such as the production of the mixture of the different additives which can be carried out during the course of the different phases of the manufacture of the anti-shock additive, and the addition of other additives performing certain specific functions, such as pigments and plasticizers, likewise constitutes no departure from the scope of the invention as defined by the appended claims.

I claim:

1. Process for preparing an improved powdered polyvinyl chloride (PVC) composition capable of being shaped on heating, said composition comprising a PVC base, and additives including at least one anti-shock additive, lubricants and stabilizers, said process comprising:
   a. pre-mixing in the dry stage said anti-shock additive, in the form of a powder, with said lubricant and stabilizer additives at a temperature in the range of 40° to 120°C, to form a premixture,
   b. cooling the dry pre-mixture obtained in step (a),
   c. mixing, in the cold state, said PVC base, in the form of a powder, with the cooled mixture obtained in step (b).

2. Process according to claim 1, wherein said PVC base is selected from the group consisting of pure PVC and PVC copolymers.

3. Process according to claim 1, wherein step (a) is effected under vacuum to eliminate water.

4. Process according to claim 1, wherein crushed cooled manufacturing residues of an already used composition are incorporated in said PVC base prior to mixing step (a).

5. Process of manufacture of shaped PVC article comprising:
   a. forming a PVC composition by cold mixing a PVC base, in the form of a powder, with an additive mixture, obtained by mixing an additive pre-mix including an anti-shock additive, in the form of a powder, pre-mixed in the dry state with a lubricant and stabilizer at a temperature of 40° to 120°C,
   b. heating the composition obtained in step a) to gel said mixture,
   c. shaping said heated compositions to form shaped objects,
   d. cooling said shaped objects.

6. The process according to claim 1 whereien said anti-shock additives are selected from the group consisting of MABS, MBS OR ABS.

* * * * *